United States Patent [19]
Roever et al.

[11] Patent Number: 5,500,694
[45] Date of Patent: Mar. 19, 1996

[54] SPECTACLE ASSEMBLY WITH REMOVABLE LENSES

[75] Inventors: Stanley Roever, Lighthouse Point; Joel Frank, North Miami Beach, both of Fla.

[73] Assignee: Quick Release, Lighthouse, Fla.

[21] Appl. No.: 155,235

[22] Filed: Nov. 22, 1993

[51] Int. Cl.$^6$ .................................................. G02C 1/08
[52] U.S. Cl. ............................ 351/97; 351/99; 351/100
[58] Field of Search .................................. 351/101, 100, 351/99, 93, 90, 86, 111, 116, 97

[56] References Cited

U.S. PATENT DOCUMENTS

| | | | |
|---|---|---|---|
| 1,272,833 | 7/1918 | Metcalf | 351/97 |
| 1,922,766 | 8/1933 | Hurwitz | 351/97 |
| 2,060,094 | 11/1936 | Martin | 351/99 |
| 2,452,159 | 10/1948 | Small | 88/41 |
| 2,652,746 | 9/1953 | Shanks | 88/47 |
| 3,471,222 | 10/1969 | Eisler | 351/61 |
| 3,542,460 | 11/1970 | Smith et al. | 351/92 |
| 3,565,517 | 2/1971 | Gitlin et al. | 351/106 |
| 3,589,802 | 6/1971 | Amaro | 351/90 |
| 3,610,742 | 10/1971 | Page | 351/106 |
| 4,056,853 | 11/1977 | Bottazzini et al. | 2/443 |
| 4,445,760 | 5/1984 | Simms | 351/95 |
| 4,523,819 | 6/1985 | Dianitsch et al. | 351/106 |
| 4,674,852 | 6/1987 | Tanaka | 351/90 |
| 4,896,955 | 1/1990 | Zider et al. | 351/41 |

Primary Examiner—Anita Pellman Gross
Assistant Examiner—Hung Xuan Dang
Attorney, Agent, or Firm—Howrey & Simon

[57] ABSTRACT

A spectacle assembly includes a spectacle frame for holding a pair of corrective lenses, the frame having left and right eyewires for mounting lenses. The eyewires are partially split into two portions to enable replacement of a lens. A right and left connector element is used to clamp together the two portions of the right and left eyewires in order to secure the lenses and to attach left and right temple stems to the spectacle frame.

11 Claims, 3 Drawing Sheets

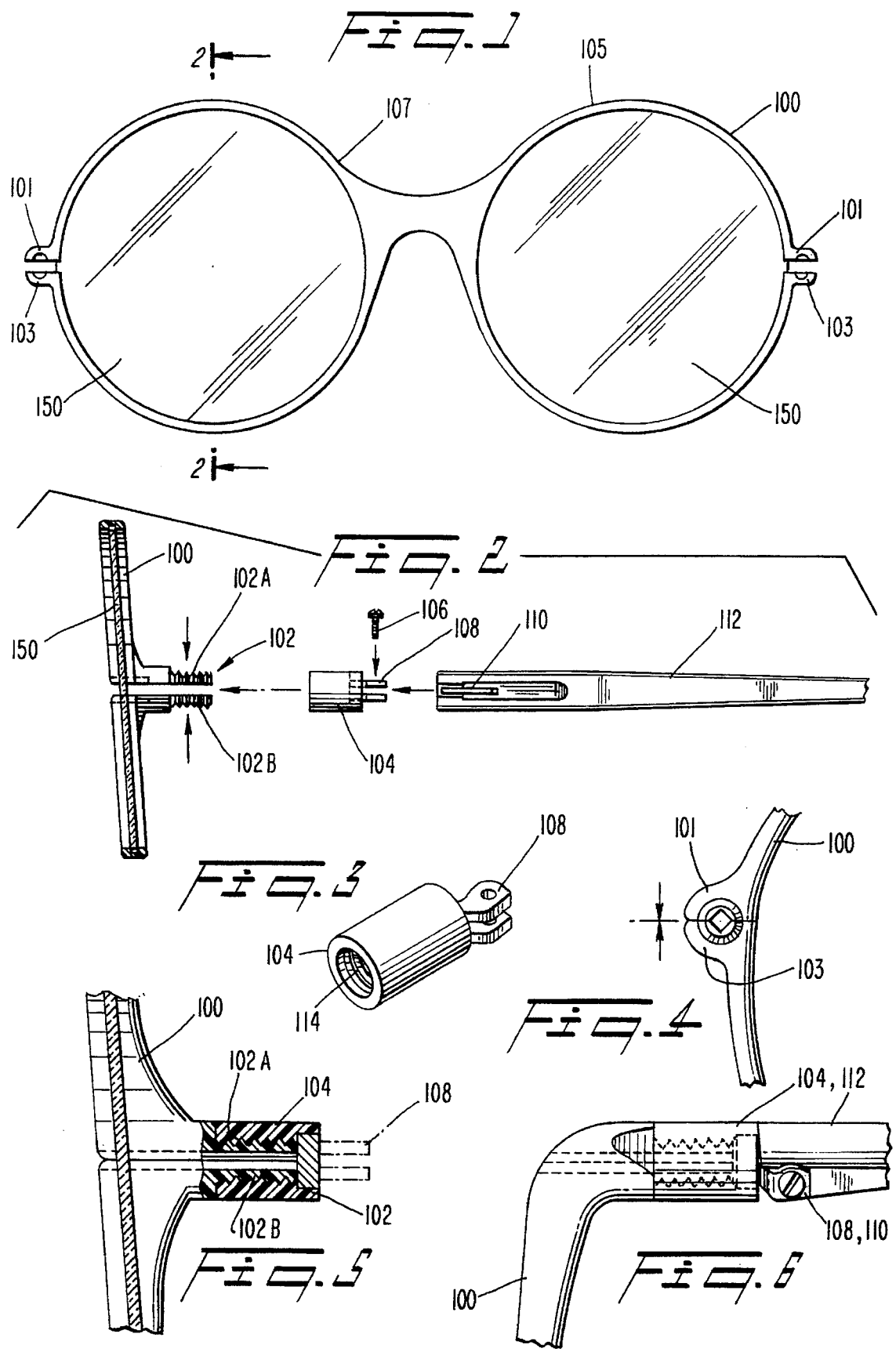

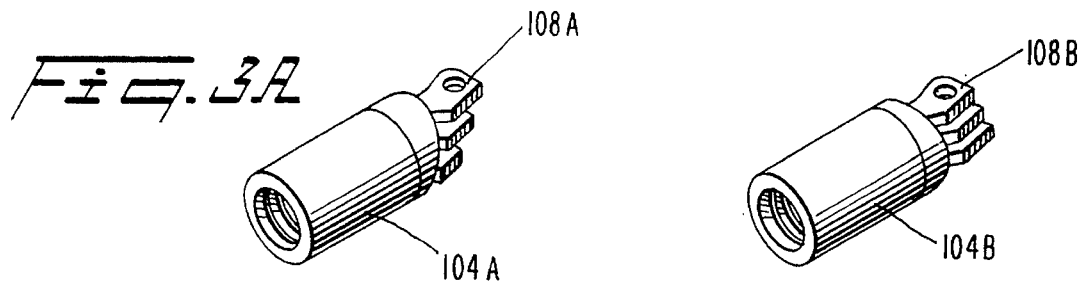
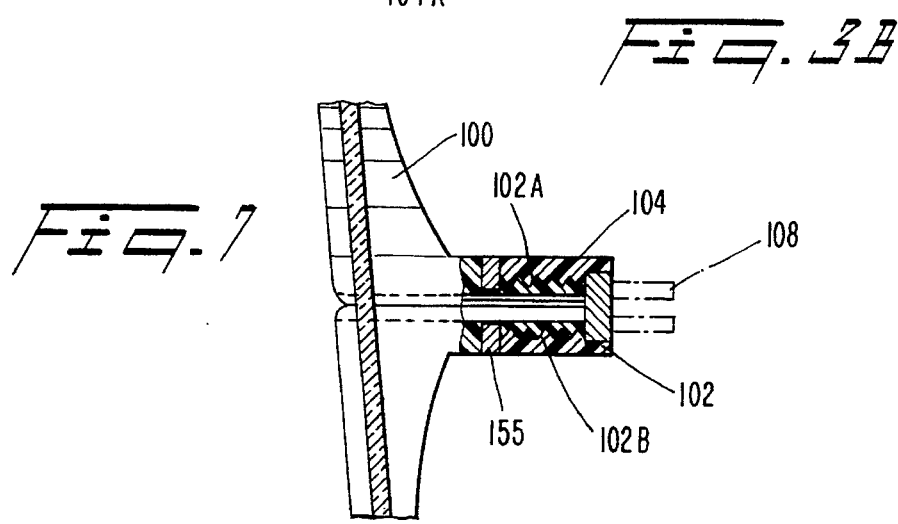
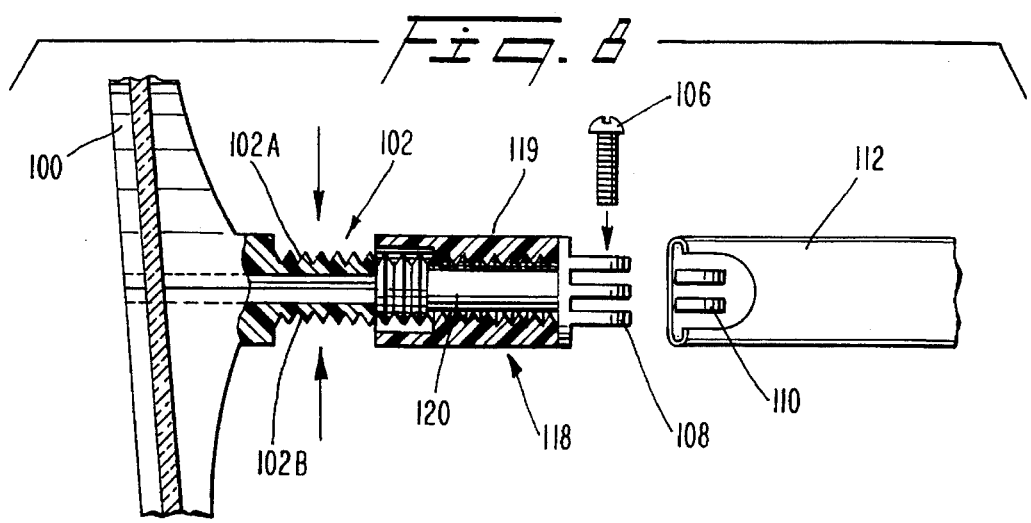
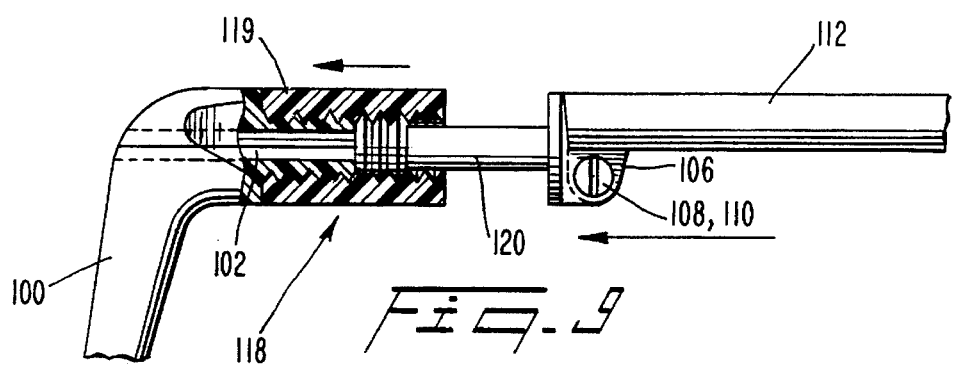

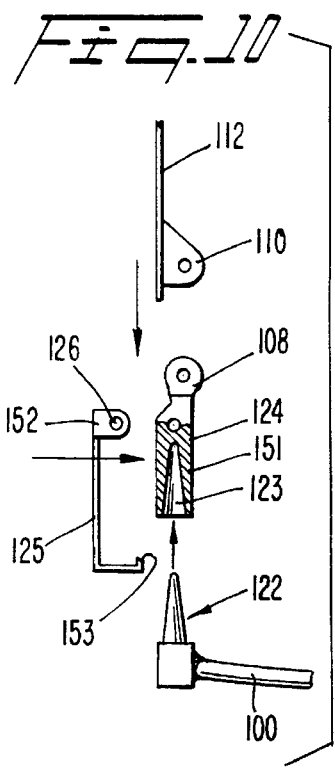
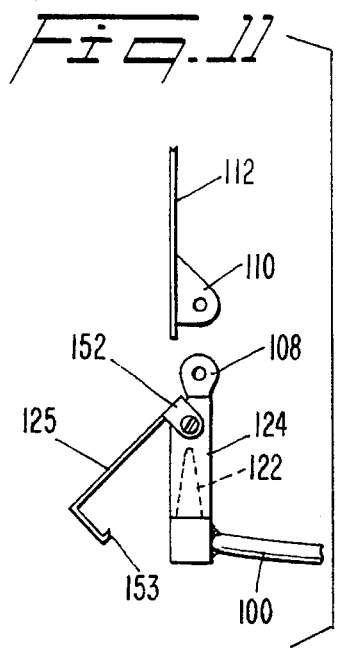
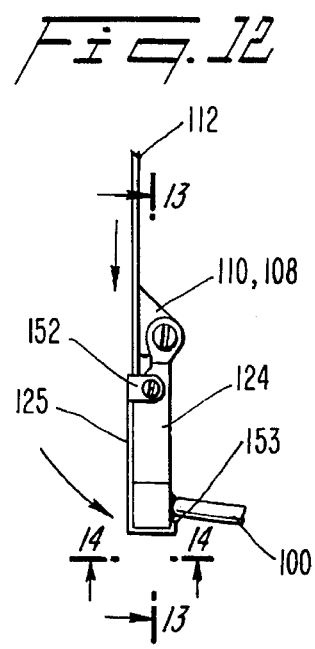
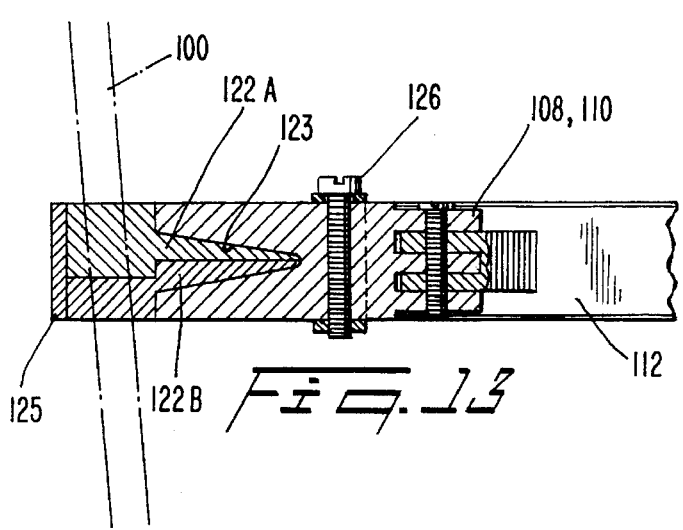
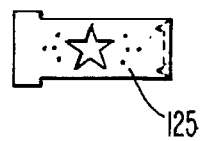
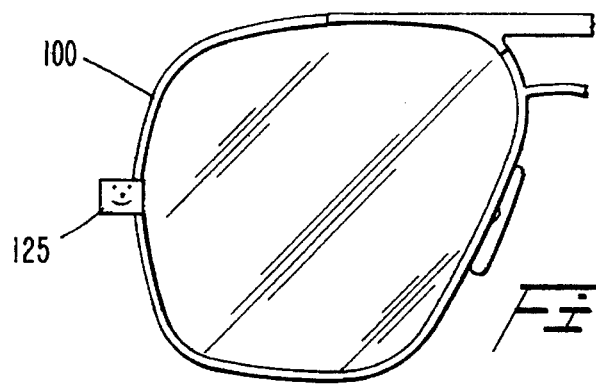

SPECTACLE ASSEMBLY WITH REMOVABLE LENSES

FIELD OF THE INVENTION

The present invention relates to an eyeglass spectacle assembly, and particularly to an eyeglass spectacle assembly useful for easily removing and replacing eyeglass lenses of the assembly which may be interchangeable.

OBJECTS AND SUMMARY OF THE INVENTION

It has long been desirable in the eyeglass industry to provide an eyeglass frame assembly that allows simple and quick removal and replacement of the lenses in that assembly. Removal and replacement can require particular optical tools and/or an apparatus for applying heat to the eyeglass frame, items which typically are not readily accessible to the user. Consequently, numerous attempts also have been made to provide eyeglass spectacle assemblies that offer improved handling capabilities of the lenses without the need of optical tools or a machine to apply heat.

U.S. Pat. No. 2,452,159 to Small, U.S. Pat. No. 2,652,746 to Shanks, U.S. Pat. No. 3,565,517 to Gitlin, et. al., and U.S. Pat. No. 4,056,853 to Bottazzini, et. al., each show eyeglass spectacle assemblies that utilize a movable flange, frame piece, or retaining structure that is mountable to the eyeglass frame and serves to secure a lens to the frame.

U.S. Pat. No. 3,471,222 to Eisler and U.S. Pat. No. 3,610,742 to Page each show an eyeglass spectacle assembly that utilizes a resilient framework that allows the lens to be removed without causing permanent deformation to the framework.

U.S. Pat. No. 4,523,819 to Dianitsch, et. al., shows an eyeglass spectacle assembly whereby the lenses are retained in the framework by a tightened thread. To remove and replace a lens, the thread is loosened and then retightened.

U.S. Pat. No. 3,542,460 to Smith, U.S. Pat. No. 3,589,802 to Amaru, U.S. Pat. No. 4,445,760 to Simms, and U.S. Pat. No. 4,896,955 to Zider, et. al., each shows an eyeglass spectacle assembly that incorporates a split framework. When the framework is split, a lens can be removed and replaced. The split framework is then fastened together to secure the replacement lens.

Although the techniques disclosed in the above patents do appear to offer some advantages, further options of adjustability, again, without the use of a special tool or apparatus typically not readily accessible to the user, might be described. For example, it might be desirable to not only remove and replace and interchange the lenses, but to also replace or adjust the temple stems as well. It might also be desirable to remove the stems from the framework so that they do not get in the way during lens replacement, or to avoid damage during lens replacement (e.g., by inadvertent bending, or even by accidental dropping).

It is a principal object of the present invention to provide a novel spectacle assembly useful for easily removing and replacing eyeglass lenses.

It is a further object of the present invention to provide an eyeglass spectacle assembly that offers greater adjustability and safety to the removal and replacement, and even interchangeability, of the eyeglass lenses without the need for a special optical tool or apparatus.

It is another object of the present invention to provide an eyeglass spectacle assembly that allows for removal and replacement of a lens and replacement or adjustment of the eyeglass stems.

It is still another object of the present invention to provide an eyeglass spectacle assembly that allows easy interchanging of the lens elements.

It is yet a further object of the present invention to provide an eyeglass spectacle assembly that allows removal and replacement of lenses and stems with few parts.

These objects and other objects not specifically enumerated here are intended to be achieved by a spectacle assembly in accordance with the present invention that includes a spectacle frame for holding a pair of corrective lenses, the frame having left and right eyewires for mounting a left and right eye lens, respectively, the left and right eyewires being partially split into two portions to enable replacement of a lens. Left and right temple stems attachable to the left and right eyewires, respectively, are included. Right and left connector elements are also provided. Each connector element is for clamping together the two portions of the right or left eyewires to secure the right and left lens. The connector elements are also for attaching the left and right temple stems to the spectacle frame.

BRIEF DESCRIPTION OF THE DRAWINGS

With reference to the drawings, preferred embodiments of the present invention are depicted wherein like reference numerals indicate like parts, and wherein;

FIG. 1 is a front view showing one preferred form of an unassembled spectacle assembly, in accordance with the present invention;

FIG. 2 is an exploded side view of a preferred embodiment of a spectacle assembly of FIG. 1, in accordance with the present invention;

FIG. 3 is a perspective view of a connector device of the spectacle assembly, in accordance with the present invention depicted in FIG. 2;

FIG. 3A is a side view of a modified connector element usable in a spectacle assembly in accordance with the present invention;

FIG. 3B is a side view of another modified connector element usable in a spectacle assembly in accordance with the present invention;

FIG. 4 is a partial front view of a left side of a spectacle assembly in the assembled condition, in accordance with the present invention;

FIG. 5 is a partial cross-sectional left side view of the spectacle assembly of FIG. 1 in the assembled condition;

FIG. 6 is a partial top right view of the spectacle assembly of FIG. 1;

FIG. 7 is a partial cross-sectional left side view of a spectacle assembly in accordance with the present invention utilizing a spacer;

FIG. 8 is an exploded partial cross-sectional side view showing another preferred form of an unassembled spectacle assembly, in accordance with the present invention;

FIG. 9 is an exploded partial cross-sectional side view of the assembled spectacle assembly of FIG. 8, in accordance with the present invention;

FIG. 10 is an exploded partial cross-sectional top view of another preferred embodiment of an unassembled spectacle assembly, in accordance with the present invention;

FIG. 11 is an exploded top view of the preferred embodiment of FIG. 10 in a partially assembled condition, in accordance with the present invention;

FIG. 12 is an exploded top view of the preferred embodiment of FIGS. 10 and 11 in an assembled condition, in accordance with the present invention;

FIG. 13 is a partial cross-sectional side view taken along the lines 13—13 of FIG. 12;

FIG. 14 is a partial front view taken along the lines 14—14 of FIG. 12;

FIG. 15 is a partial front view of a further embodiment of a spectacle assembly, in accordance with the present invention.

DETAILED DESCRIPTION

One preferred embodiment of the present invention includes a spectacle frame 100 that holds a pair of corrective lenses 150 with left and right eyewires 105, 107. At one side of each eyewire 105, 107, the eyewire is split into two portions 101, 103 which enable removal and replacement of the eyeglass lens 150 (FIG. 1 ). The shape of the eyewire is intended to enable interchange of left and .right lenses. As is understood in the industry, the eyewire can be metal, plastic or any other suitable material.

Each of the left and right eyewires 105, 107 includes a split, generally tubular endpost 102 that extends substantially perpendicularly from the plane of the eyewire in which a lens 150 is mounted (FIGS. 2, 5 and 6). One half 102A of the endpost 102 is integral with the one split portion 101 of the eyewire 100 and the other half 102B of the endpost 102 is integral with the other split portion 103 of the eyewire 100. The endpost includes external threads.

For each of the left and right eyewires 105, 107, a connecting element 104 performs the dual function of (1) clamping together the two split portions 101, 103 to secure the lens in the spectacle frame 100, and (2) hingedly attaching the temple stem 112 to the frame 100 (FIGS. 2, 3, 5 and 6). To clamp together the two split portions 101,103, the connecting element 104 is shaped in the form of a barrel with a single bore extending along a longitudinal axis of the element. Included in the barrel are internal threads 114 for engaging the external threads of the endpost 102. As the connecting element 104 is screwed onto the endpost 102, the two halves 102A, 102B of the endpost are urged together, thus clamping together the two split portions 101,103 of the eyewire, which, in turn, secures a lens 150 in the spectacle frame 100 (FIGS. 4, 5 and 6).

At an end opposite the opening of the threaded bore 114, the connecting element 104 includes a hinge 108 suitable for engaging a mating hinge 110 of a temple stem 112. The two hinges 108, 110 are secured together with a hinge pin or screw 106.

In order to provide the option of connecting the temple stem 112 to the frame 100 in a manner that varies the angular relationship between the two, different forms of connecting elements 104A, 104B may be provided on which hinges 108A, 108B are attached to the connecting barrels at a predetermined angle (FIGS. 3A, 3B) for mating with a complementary hinge of a temple stem. To achieve a pantoscopic angular relationship, a connecting element 104A (FIG. 3A) having a downwardly slanted hinge 108A would be utilized. To achieve retroscopic angular relationship, a connecting element 104B (FIG. 3B) having an upwardly slanted hinge 108B would be utilized. Either a pantoscopic or a retroscopic relationship may be desired depending on the level of the user's ears relative to the user's nose. It is typically a goal to position the lens 150 so that the eye is viewing through the center of the lens and so that the lens is substantially parallel to the eye.

It is appreciated that the connecting elements 104, 104A, 104B when mounted on the endpost 102, will need to be oriented so that the barrel of the hinge 108, 108A, 108B is positioned upright as depicted in FIG. 2. Otherwise, the temple stem 112 when attached to the hinge 108, 108A, 108B will not be oriented to correctly rest on the user's ear. It will be appreciated that the angular orientation of the hinge is dependent on the length of the split endpost 102 and the number of threads. To accommodate these factors and also to allow for correct orientation of the barrel of the hinge, one or more spacers 155 of given thickness may be incorporated between the connecting element 104 and the base of the split endpost 102 (FIG. 7). The spacer 155 would be sized to block rotation of the connecting element 104 at a correct orientation of the barrel of the hinge.

In another embodiment of the present invention, the dual functions of clamping together the split portions 101, 103 and hingedly attaching the temple stem 112 are performed by a connecting element 118 that includes internally threaded barrel or sleeve 119 mounted on a threaded rod 120 (FIGS. 8 and 9). This embodiment may be desired in instances where lens thickness may discourage use of the previously described connecting elements.

To clamp the split portions 101, 103, the sleeve 119 is screwed onto the endpost halves 102A, 102B (FIG. 9) and the rod 120 is screwed into the other end of the sleeve 119. The rod 120 includes at one end a hinge 108C that mates with the hinge 110C of the temple stem 112 through the hinge pin or screw 106. If desired, pantoscopic or retroscopic arrangements such as those depicted in FIGS. 3A and 3B may be employed.

In a further embodiment of the present invention, the split endpost 122 may be configured to have a conical or wedge shape (FIGS. 10–13). As with the previously described embodiments, one half 122A of the endpost is integral with one split portion 101 of the eyewire while the opposite half 122B is integral with the other split portion 103 of the eyewire.

The dual function of clamping together the split portions 101, 103 and of attaching the temple stem 112 is performed by a connecting element 124 that includes a shank 151 having an orifice 123 that is shaped to conformingly mate with and securely receive the wedge or cortically shaped endpost 122, which is made up of the two split halves 122A, 122B (FIGS. 10–14). For holding the assembly together, the connecting element 124 of this embodiment incorporates a clamp device. Particularly, a clamp member 125 is pivotally mounted, by means of a pin or screw 126, to an end of the shank 151 near the hinge 108. When the clamp member is mounted on the shank 151, the pin or screw 126 extends through the thickness of the shank 151 and through a bracket 152 mounted on the clamp member 125.

The clamp member 125 is substantially "L-shaped" such that, when the clamp is serving its clamping function, an elongated side of the clamp extends adjacent the shank 151 of the connecting element 124 and a shorter side of the clamp disposed at a right angle to the elongated side rests against a front section of the eyewire 100 (FIG. 13).

To assemble the spectacle frame, the endpost 122 (which is conical or wedge-shaped) of the spectacle frame 100 is inserted into the orifice 123 (which is correspondingly shaped) of the shank 151. Since the endpost 122 is formed of two halves 122A, 122B, the corresponding shape of the orifice 123 therefore serves to mate the two halves together when they are inserted into the orifice 123.

Once the endpost 122 is inserted sufficiently into the orifice 123 so as to secure the lens element 150 in the frame 100, the clamp 125 is pivoted about the pin or screw 126. The elongated side of the clamp 125 has a length such that, upon pivoting, the short side of the clamp 125 will come to rest upon a surface of the frame 100 opposite the endpost 122 and thereby snugly secure the endpost 122 within the orifice 123 (FIGS. 10–12). To hold the clamp in the pivoted, assembled position, the short side of the clamp may include a locking flange 153 that extends perpendicularly from the short side and engages a side of the frame 100. Thereby, the clamp 125 is locked into the pivoted position, thus ensuring that the endpost 122 remains inserted within the orifice 123.

To add to the aesthetics of the spectacle frame 100, decorative artwork may be added to the front surface of the clamp 125 such that when the connecting element 124 is clamped to the spectacle frame 100, the artwork is visible on the front of the frame 100 (FIGS. 14, 15). The frame may be shaped as shown in FIG. 15 or may be shaped for interchangeability of left and right lenses as shown on FIG. 1.

When the frames are shaped for interchanging the left and right lens, the system of the present invention enables a user to easily assemble corrective glasses according to the user's needs at any particular time. For example, by making available to the user a collection of lenses having various ophthalmic characteristics, the user can easily mix and match those lenses in a spectacle assembly in accordance with the present invention to provide desired corrective glasses at any particular time. As depicted in FIG. 1, right lenses can be interchanged with left lenses which have the same shape. In this manner, the user has available numerous combinations of lenses to easily and quickly provide glasses suitable for nearly any particular need.

The above-described preferred embodiments are merely exemplary in nature and are not intended to represent the only embodiments contemplated by the present invention as set forth in the appended claims.

What is claimed is:

1. A spectacle assembly comprising:
   a spectacle frame for holding a pair of corrective lenses, said frame having left and right eyewires for mounting a left and right eye lens, respectively, said left and right eyewires being partially split into two portions to enable replacement of a lens;
   a left and right temple stem attachable to said left and right eyewires, respectively;
   a right and left connector element for clamping together said two portions of said right and left eyewires to secure said right and left lens, and for attaching said left and right temple stems to said spectacle frame;
   each of said left and right eyewires includes an endpost extending substantially perpendicularly from the plane of said eyewire in which a lens is mounted, one half of said endpost being integral with one split portion of said eyewire, an opposite half of said endpost being integral with the other split portion of said eyewire; and
   wherein said connector element includes means projecting perpendicularly from the plane of said eyewire for engaging said substantially perpendicularly extending endpost such that said halves are secured together to thereby clamp together said split portions of said eyewire.

2. A spectacle assembly according to claim 1, wherein each of said fight and left connector elements is shaped to orient said temple stems pantoscopically relative to said eyewires.

3. A spectacle assembly according to claim 1, wherein each of said right and left connector elements is shaped to orient said temple stems retroscopically relative to said eyewires.

4. A spectacle assembly comprising:
   a spectacle frame for holding a pair of corrective lenses, said frame having left and right eyewires for mounting a left and right eye lens, respectively, said left and right eyewires being partially split into two portions to enable replacement of a lens;
   a left and right temple stem attachable to said left and right eyewires, respectively;
   a right and left connector element for clamping together said two portions of said right and left eyewires to secure said right and left lens, and for attaching said left and right temple stems to said spectacle frame;
   wherein each of said left and right eyewires includes an endpost extending substantially perpendicularly from the plane of said eyewire in which a lens is mounted, one half of said endpost being integral with one split portion of said eyewire, an opposite half of said endpost being integral with the other split portion of said eyewire;
   wherein said connector element includes means projecting perpendicularly from the plane of said eyewire for engaging said substantially perpendicularly extending endpost such that said halves are secured together to thereby clamp together said split portions of said eyewire;
   wherein external threads are disposed on said endpost;
   and wherein said connector element includes a barrel-shaped piece having a single bore extending along a longitudinal axis of said connector element, said means for engaging said endpost being internal threads disposed along said bore of said connector element.

5. A spectacle assembly according to claim 4, wherein a threaded rod is threaded into said barrel-shaped piece at the end of the base opposite the end which receives the endpost.

6. A spectacle assembly according to claim 5, wherein said threaded rod includes a hinge for attachment of said temple stem.

7. A spectacle assembly according to claim 4, wherein said barrel-shaped piece includes a hinge for attachment of said temple stem.

8. A spectacle assembly comprising:
   a spectacle frame for holding a pair of corrective lenses, said frame having left and right eyewires for mounting a left and right eye lens, respectively, said left and right eyewires being partially split into two portions to enable replacement of a lens;
   a left and right temple stem attachable to said left and right eyewires, respectively;
   a right and left connector element for clamping together said two portions of said right and left eyewires to secure said right and left lens, and for attaching said left and right temple stems to said spectacle frame;
   wherein each of said left and right eyewires includes an endpost extending substantially perpendicularly from the plane of said eyewire in which a lens is mounted, one half of said endpost being integral with one split portion of said eyewire, an opposite half of said endpost being integral with the other split portion of said eyewire;

wherein said connector element includes means projecting perpendicularly from the plane of the eyewire for engaging said substantially perpendicularly extending endpost such that said halves are secured together to thereby clamp together said split portions of said eyewire;

wherein said endpost has the shape of a wedge;

and wherein said connector element includes a clamp pivotally mounted to a shank, said clamp being movable to secure said shank to said eyewire, said means for engaging said endpost being a wedge-shaped opening in said shank for receiving said endpost.

9. A spectacle assembly according to claim 8, wherein said shank includes a hinge for attachment of said temple stem.

10. A spectacle assembly comprising:

a spectacle frame for holding a pair of corrective lenses, said frame having left and right eyewires for mounting a left and right eye lens, respectively, said left and right eyewires being partially split into two portions to enable replacement of a lens;

a left and right temple stem attachable to said left and right eyewires, respectively;

a right and left connector element projecting perpendicularly from the plane of the eyewire for clamping together said two portions of said right and left eyewires to secure said right and left lens, and for attaching said left and right temple stems to said spectacle frame;

a collection of left and right eye lenses of varying ophthalmic characteristics, each left and right eye lens being mountable and interchangeable in said spectacle frame;

and wherein said spectacle frame is shaped so that left and right eye lenses are interchangeable with each other.

11. A spectacle assembly comprising:

a spectacle frame for holding a pair of corrective lenses, said frame having left and right eyewires for mounting a left and right eye lens, respectively, said left and right eyewires being partially split into two portions to enable replacement of a lens;

a left and right temple stem attachable to said left and right eyewires, respectively;

a right and left connector element projecting perpendicularly from the plane of the eyewire for clamping together said two portions of said right and left eyewires to secure said right and left lens, and for attaching said left and right temple stems to said spectacle frame;

wherein the spectacle frame is shaped so that left and right eye lenses are interchangeable with other.

* * * * *